Patented May 7, 1929.

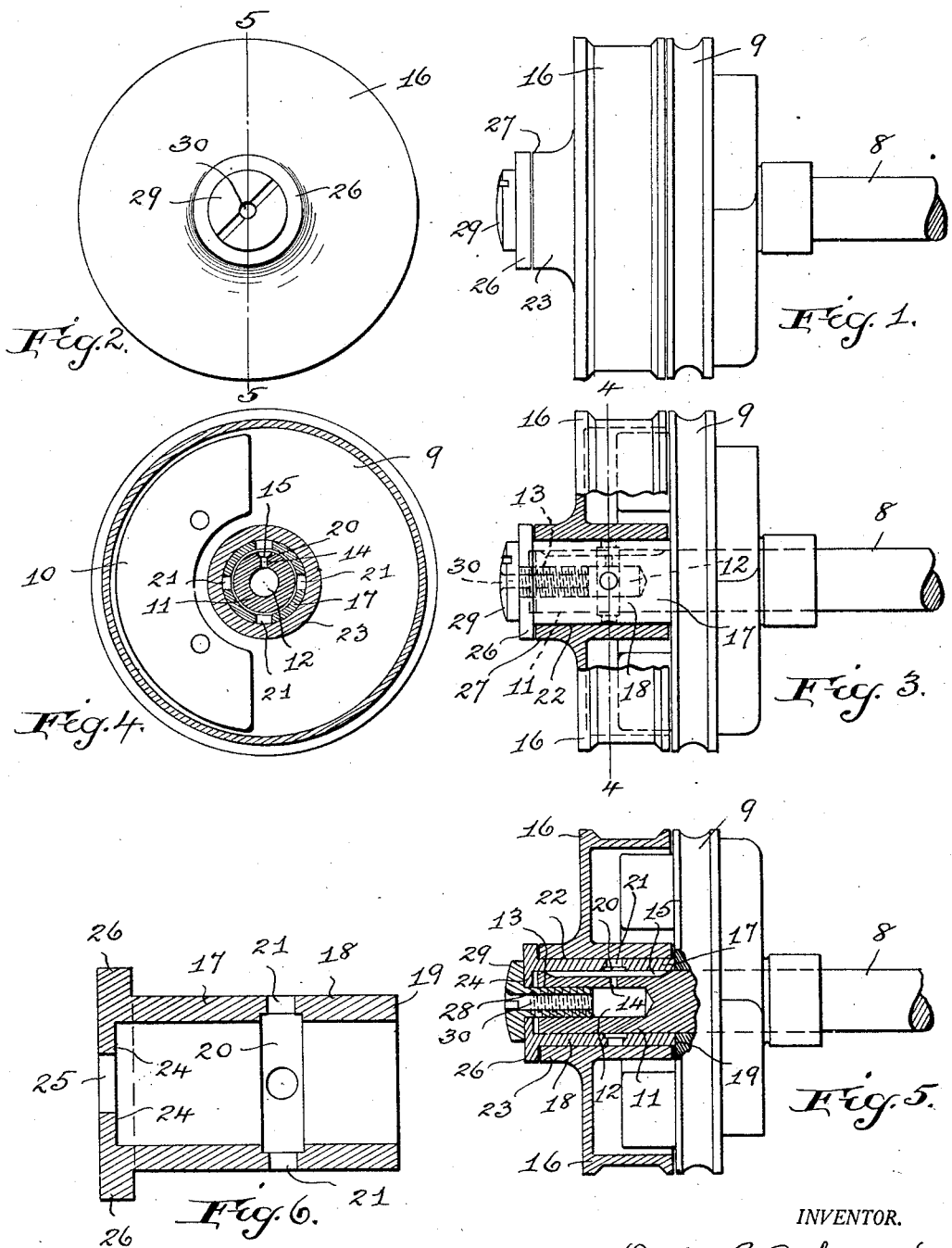

1,712,064

UNITED STATES PATENT OFFICE.

DAVID B. ASHMAN, OF BALTIMORE, MARYLAND.

MEANS FOR ATTACHING LOOSE PULLEYS.

Application filed December 8, 1926. Serial No. 153,334.

This invention relates to improved means for attaching loose pulleys to the shafts of button-hole sewing machines.

For years past difficulty has been experienced in the maintenance of button-hole sewing machines because of wear that has taken place between the loose pulley and the shaft on which it has turned.

These shafts carry a tight pulley with a shock-absorbing means therein because rapid starting and stopping of the shaft is a requisite.

The operation of these machines is such that the machine is stopped in practically the same position at the end of each stitching operation because the needle must be raised or withdrawn from the work.

Between the tight pulley and the outer end of the shaft the latter has carried the loose pulley and this latter pulley is driven very much more than the tight pulley and its shaft and frequently revolves through long periods of time when the machine is not actually in use.

Lack of proper lubrication between the loose pulley and the shaft results in wear on the shaft which increases rapidly when started and results in the loose pulley running unevenly and finally requires the entire renewal of the shaft.

While the renewal cost of a new shaft and pulley may be six or seven dollars, the labor expense in effecting that renewal often reaches and sometimes exceeds the sum of fifty dollars.

This condition has prevailed for years to my knowledge, and I have personally during that period of time removed many of these pulleys and shafts and replaced them with new pulleys and shafts.

Other sewing-machine repair men and mechanics have had the same experience with these machines that I have had and it has always been deemed necessary to remedy the trouble by removal of the parts.

My present invention has for its object the provision of improved means for use with new shafts, or as readily applied to worn shafts and loose pulleys, to prevent or remedy the trouble and expense above explained.

The invention is illustrated in the accompanying drawing, wherein,—

Fig. 1 shows in side elevation a portion of a shaft of a button-hole sewing machine with the tight and loose pulleys thereon and with my improved features coacting therewith.

Fig. 2 illustrates the same in end elevation.

Fig. 3 shows the shaft and tight pulley in side elevation but illustrates the loose pulley in section to disclose my improved means for mounting that pulley.

Fig. 4 illustrates a cross-sectional detail through the loose pulley, its mounting and the shaft-end,—the section being taken on the line 4—4 of Fig. 3.

Fig. 5 shows a vertical longitudinal sectional detail through the same parts showing them as they would appear if viewed on the line 5—5 of Fig. 2, and Fig. 6 illustrates an enlarged longitudinal sectional detail through the mounting, detached.

Referring to the drawing, the numeral 8 designates the shaft of a button-hole sewing machine and 9 the tight pulley mounted thereon in the usual manner and having the usual devices in the housing 10, for absorbing the shocks of sudden starting and stopping, but which are not a part of my invention except in so far as they cooperate with the loose pulley to do the work the machine is intended to do.

The outer end 11, of the shaft 8, has a central short bore or chamber 12, therein for the reception of lubricant, such as oil, and from the extreme end of the shaft inwardly this bore or chamber 12, is provided with interior screw-threads 13.

An oil hole or port 14, extends radially through the shaft 11 from the chamber 12 and the outer end of this radial hole or port opens into a longitudinal groove 15 that is provided along the outer circumference of the shaft, as shown in Figs. 4 and 5 of the drawing.

Instead of mounting the loose pulley 16, directly on this outer shaft-end as has been done for years past, I provide a headed sleeve mounting 17, on the shaft which I interpose between said shaft and the loose pulley.

This headed mounting 17, in the present instance, has a sleeve portion 18 that extends inwardly over the shaft-end and has its inner end 19, seated against the side or hub portion of the tight pulley 9, and the loose pulley 16 turns about the external circumference of the mounting.

The sleeve portion 18 of the mounting is provided with an interior annular groove or channel 20, extending all the way about the shaft-end 11 and from this annular groove 20, there extend a series of radial oil-feed ports 21 through the mounting which open at the inner wall 22, of the loose pulley hub 23 whereby to feed oil to and distribute it between said pulley hub and the circumference of the mounting 17, to thoroughly lubricate those contact surfaces.

The loose pulley 16 is open at its inner side and hollow between its hub and circumference so as to telescope or project over the housing 10 on the side of the tight pulley.

The outer end of the mounting 17 has an annular inturned flange 24 which turns inwardly around the shaft-end 11 but leaves a central opening 25, of a diameter at least as large as the diameter of the central bore or chamber 12 in the shaft.

The mounting also preferably has an outturned annular flange 26 of a diameter that will enable it to overlap the end-face 27 of the loose pulley hub 23.

The length of the mounting 16 from the annular flange 26 to the side of the tight pulley is slightly greater than the bore through the loose pulley hub so the hub cannot be clamped between the flange 26 and the tight pulley, but the inner end of the mounting seats against the outer side of the tight pulley.

A screw 28, having a head 29 of a greater diameter than the diameter of the shaft-end 11, passes through the central opening 25 of the mounting 17 and screws into the threaded bore or chamber 12, but this screw is shorter than said bore or chamber so as to leave a space therein for lubricant or oil.

A central passage 30 extends through the screw and opens into the bore or chamber so that oil may be fed therethrough into the chamber and then flow out radially through the port 14 into groove 15 and then through annular channel 20 and ports 21 of the mounting to effect the lubrication between the loose pulley and mounting 16.

When the screw 28 is screwed in tight, its head 29 seats against the headed outer end of the mounting and crowds the latter onto the shaft-end,—the screw being centered on the shaft and the head extending at right-angles to the shaft-axis ensures that the mounting will be held rigidly about and concentric with the shaft when the inner end of the mounting seats directly against the side of the tight pulley.

To facilitate and ensure this centralization of the mounting on the shaft-end, particularly when that shaft-end is badly worn, as is frequently the case, the inner end of the mounting seats against a vertical face of the tight pulley and with this in view, I form the mounting of such length that its inner end will seat against the side of the tight pulley 9 so that when the head 29 of the screw seats against the headed outer end of the mounting, the inner end of the mounting will seat against the side of the tight pulley,—the head of the screw will square up the outer end of the mounting and the latter will be clamped rigidly in place with its axis parallel to the axis of the shaft.

Having described my invention, I claim,—

1. The combination with the shaft of a button-hole sewing machine, said shaft having an oil chamber in its outer end, a tight pulley on said shaft beyond the inner end of the said oil-chamber, a mounting on the shaft-end around the oil chamber, said mounting having at its outer end an inturned flange and an out-turned flange,—the inturned flange producing a central opening in the end of the mounting that communicates with the oil-chamber in the shaft, a loose pulley on the mounting between the out-turned flange and the side of the tight pulley and a screw having a head to seat against the closed end of the mounting, said screw screwing into the end of the oil chamber and the head of the screw by engaging the end of the mounting causing the latter to center about the shaft-end irrespective of any flat faces on the latter.

2. The combination with the shaft of a button-hole sewing machine, said shaft having a central oil-chamber in its end and also having an oil passage extending radially from the oil-chamber to the outer circumference of the shaft, a tight pulley on the shaft near the inner end of the oil-chamber, a headed mounting on said shaft and covering the end-portion of the shaft, said mounting being provided with radial oil passages leading to the outer circumferential side thereof from and around the oil passage through the shaft, a loose pulley on the mounting and a screw passing through the end of the mounting and entering the oil-chamber of the shaft to close the outer end of the oil-chamber, and the head of the screw by seating against the headed mounting seating the inner end of the latter against the side of the tight pulley and centering the mounting on the shaft-end regardless of any flat faces around the circumference of the shaft-end.

In testimony whereof I affix my signature.

DAVID B. ASHMAN.